US009424515B2

(12) United States Patent
Atlas

(10) Patent No.: US 9,424,515 B2
(45) Date of Patent: Aug. 23, 2016

(54) PREDICTING TAXI UTILIZATION INFORMATION

(71) Applicant: FasterFare, LLC, New York, NY (US)

(72) Inventor: Stephen Andrew Atlas, New York, NY (US)

(73) Assignee: Fasterfare, LLC, New York, NY (US)

( * ) Notice: Subject to any disclaimer, the term of this patent is extended or adjusted under 35 U.S.C. 154(b) by 304 days.

(21) Appl. No.: 13/706,331

(22) Filed: Dec. 5, 2012

(65) Prior Publication Data

US 2013/0144831 A1    Jun. 6, 2013

Related U.S. Application Data

(60) Provisional application No. 61/566,842, filed on Dec. 5, 2011, provisional application No. 61/583,225, filed on Jan. 5, 2012.

(51) Int. Cl.
| | |
|---|---|
| *G06Q 50/30* | (2012.01) |
| *G06N 5/02* | (2006.01) |
| *G06Q 10/04* | (2012.01) |
| *G06Q 10/06* | (2012.01) |

(52) U.S. Cl.
CPC .................. *G06N 5/02* (2013.01); *G06Q 10/04* (2013.01); *G06Q 10/06* (2013.01); *G06Q 50/30* (2013.01)

(58) Field of Classification Search
CPC .............................. G06Q 10/02; G06Q 10/025
USPC .......................................... 706/5–6, 341, 925
See application file for complete search history.

(56) References Cited

U.S. PATENT DOCUMENTS

| 5,168,451 | A  * | 12/1992 | Bolger ................... G08G 1/127 |
| | | | 340/994 |
| 6,453,298 | B2 * | 9/2002 | Murakami et al. ........... 705/7.25 |
| 6,931,308 | B2 * | 8/2005 | Read ................................ 701/1 |
| 8,469,153 | B2 * | 6/2013 | Wu ................................ 187/383 |
| 8,676,668 | B2 * | 3/2014 | Wolfe .......................... 705/26.7 |

(Continued)

OTHER PUBLICATIONS

Hunting or Waiting? Discovering Passanger-Finding Strategies from a Large-scale Real-world Taxi Dataset, by Bin Li, published 2011.*

(Continued)

*Primary Examiner* — Stanley K Hill
*Assistant Examiner* — Thomas Fink
(74) *Attorney, Agent, or Firm* — Andrew J. Anderson, Esq.; Harter Secrest & Emery LLP

(57) ABSTRACT

Techniques are described for automatically analyzing contingencies in information predicting taxi demand. This is to generate representative information regarding current or future taxi demand, and for using such generated representative taxi demand. Contingent demand information may be generated for a variety of types of useful measures of taxi demand rates, such as for projecting expected likelihood of finding a passenger at each of several road locations. Generated representative contingent taxi demand information may be used in various ways to assist taxi and livery service drivers plan optimal routes and schedules. The historical and/or recent contingent demand data may be used to generate the representative traffic flow information. This may include data readings from mobile data sensors in the one or more vehicles, data sensors in or near the roads, or aggregate data sources collected from one or more sensors or through publicly available data sets.

28 Claims, 2 Drawing Sheets

(56) References Cited

U.S. PATENT DOCUMENTS

| | | | |
|---|---|---|---|
| 2002/0077876 A1* | 6/2002 | O'Meara | G06Q 10/06 705/7.15 |
| 2009/0313077 A1* | 12/2009 | Wheeler, IV | 705/9 |
| 2012/0265580 A1* | 10/2012 | Kobayashi et al. | 705/7.31 |
| 2013/0024249 A1* | 1/2013 | Zohar | G07B 15/02 705/13 |
| 2014/0067491 A1* | 3/2014 | James et al. | 705/13 |

OTHER PUBLICATIONS

Where to Find My Next Passanger?, by Yuan, published 2011.*

Analysis of the passenger pick-up pattern for taxi location recommendation, by Lee, published 2008.*

Towards Reducing Taicab Cruising Time Using Spatio-Temporal Profitability Maps, by Powell, published 2011.*

* cited by examiner

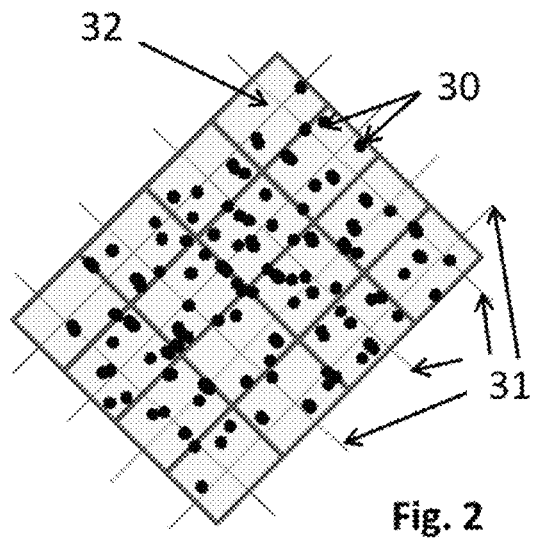
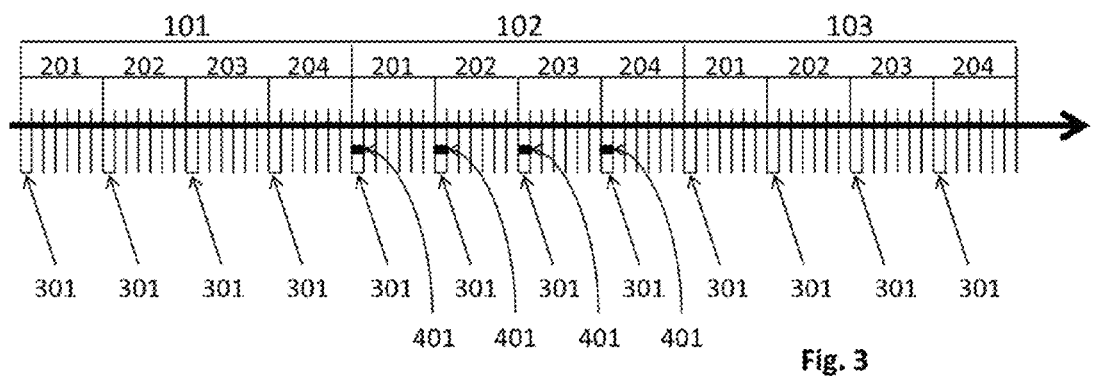

PREDICTING TAXI UTILIZATION INFORMATION

TECHNICAL FIELD

The following disclosure relates to the technical field of data analytics. More particularly, the present invention involves techniques for automatically analyzing data to find where demand is contingent on events in order to generate representative information regarding current or future taxi utilization information.

BACKGROUND

As in many cities, the drivers of New York City's 13,000 medallion taxis face a boom-and-bust cycle every day. The rush hour periods are the exception. During the majority of the day, there is intense competition for passengers and many drivers simply stop trying. Persistence during the non-peak hours is critical for earning a living wage, as a large fraction of rides occur during non-peak hours yet demand decreases considerably during those times. Many drivers state that it is both highly important to find passengers quickly during these slow periods, yet it is also highly difficult.

Drivers go to great lengths to form accurate expectations about where their time will be best spent looking for passengers. However, drivers have incomplete knowledge about where taxis are most likely to be needed. In addition to requiring taxi drivers to work harder, this incomplete information produces other negative effects. Taxi drivers must search longer per fare, which produces more traffic on congested streets as well as more noise and atmospheric pollution. Drivers who exert greater effort per fare are more likely to suffer from fatigue and to compete more aggressively for passengers, making the roads more dangerous. Finally, inefficient taxi allocation limits passengers' access to taxis.

BRIEF SUMMARY OF THE INVENTION

The present invention is a method of generating information about where taxis are most likely to be needed (i.e. taxi demand) in the present and where they are likely to be needed in the future. It combines and predicts demand contingent on events which historically predict taxi demand, in order to project current and future representative contingent demand information.

BRIEF DESCRIPTION OF THE DRAWINGS

FIG. 2 illustrates a map with a graphical representation of spatial taxi utilization aggregation categories.

FIG. 3 illustrates a graphical representation of temporal taxi utilization aggregation categories.

DETAILED DESCRIPTION

Figure 1:
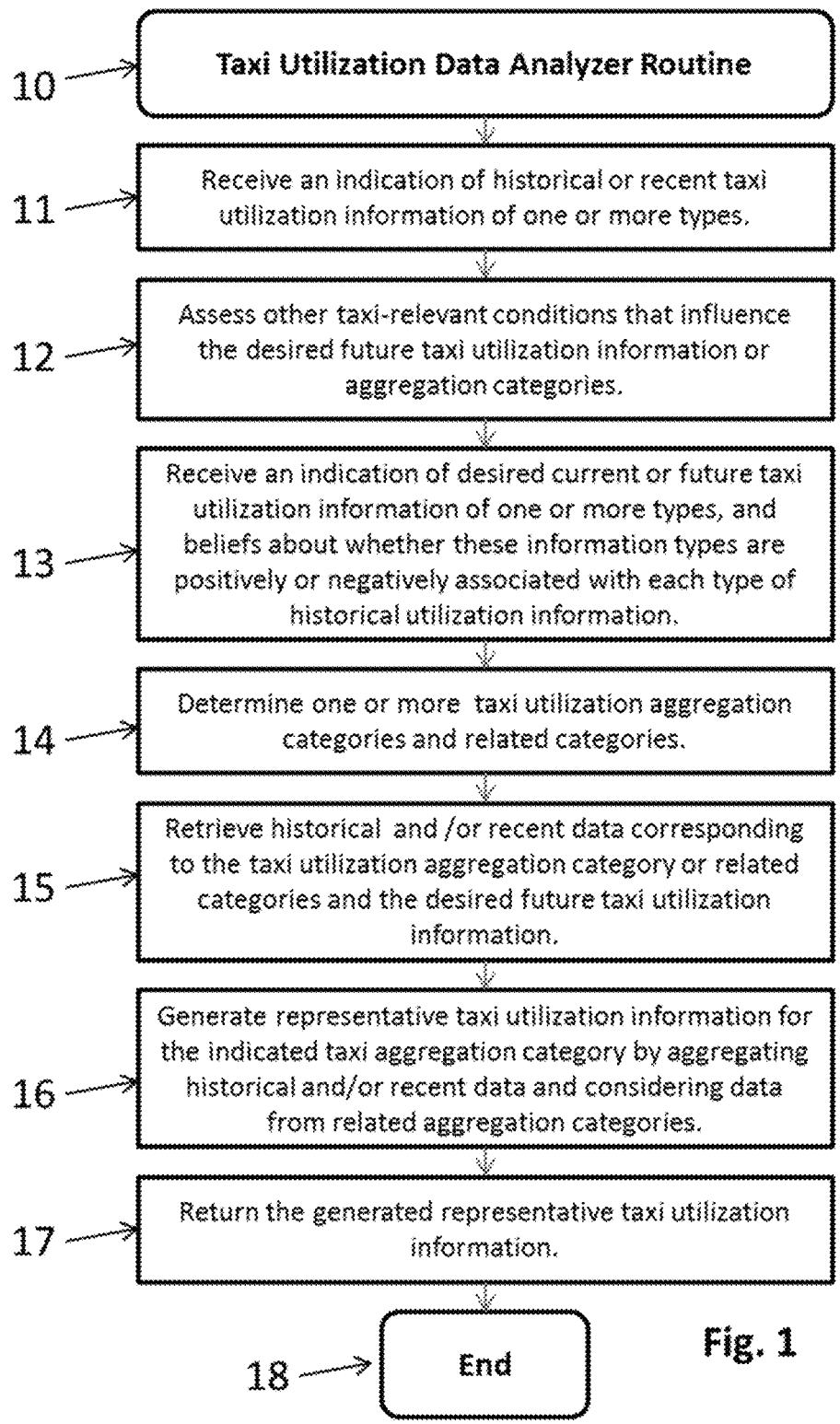
FIG. 1 is a flow diagram of an example embodiment of a representative contingent taxi utilization analyzer routine.

Referring now to the invention in more detail, techniques are described for analyzing historical and recent information about contingent taxi utilization in order to generate representative information about present or future contingent taxi utilization. FIG. 1 provides an example embodiment of a representative Contingent Taxi Utilization Analyzer Routine and displays how one embodiment of the present invention generates representative information about present or future contingent taxi utilization information by analyzing historical and recent taxi utilization information. As shown in that figure, one embodiment of the present invention can be embodied as seven steps (11-17). This section outlines, in detail, what each step is, how each step is used, how each step can be constructed, and how the steps fit together. It will then discuss advantages of the present invention.

As used throughout this specification, "taxi utilization information" generally refers to any information about or relating to taxi usage. Such information may include, but is not limited to, information specific to a certain taxi, such as location at any given time, passenger capacity, and fare information, and global information about more than one taxi, such as taxi supply information like the number of taxis in any given area and taxi demand information like the number of taxis that are required at a given location. Taxi utilization information can also include combinations of multiple types of taxi usage, supply, and/or demand information, including but not limited to ratios between the number of pickups and drop-offs during a particular time period at a particular location.

Also throughout this specification, "taxi" is intended to refer to any means of transportation used to convey passengers or items in return for payment or fare, including but not limited to street taxis that pick up passengers on the street, livery vehicles that respond to prearranged trips, limousines, and delivery services.

Referring still to FIG. 1, the invention, in step 11, receives and maintains historical and/or recent taxi utilization information of one or more types (11). Among other places, this data could come from an external data source such as the historical data available via Freedom of Information Act requests from the Taxi and Limousine Commission in New York City, from data collected by payment vendors, or from other data sources comprised of aggregated data from devices placed in or around taxis. The information may contain, for example, trip level information such as trip start and trip end location information, time between trips, time of the trip, and other details during or after the taxi trip. The information may also include information about other taxis. For example, recent taxi utilization information may include the location and number of any and all other taxis.

As used herein, the terms historical and recent may both be used to refer to information about prior taxi utilization. "Recent" information is closer in time to the present and may actually include current information, such as the current location of other taxi cabs. Regardless, both types of information are "historical" in that they may include information about the past. Delineation between recent and historical may be drawn based on the source of the information, i.e., historical information may come from the Commission mentioned above, while recent information may be obtained in real-time. Both historical and recent data are collected and stored in one or more databases, such as through cloud data storage or locally on a server or computer, either of which must have storage that is sufficiently large to hold the taxi trip data and the data described in the other components, below. As will also be described, the historical and recent taxi demand information is accessible and sortable by a computer processor, for purposes of determining current and/or future taxi demand.

Referring still to FIG. 1. in step 12 other taxi-relevant conditions are assessed. Such conditions are those that influence the desired future contingent taxi demand information or aggregation categories (12) (described below). Here, the conditions generally include data from relevant sources and might include the schedule of events known to produce taxis. Such events may include other components of the transportation network, e.g. bus schedules, train schedules. Taxi-relevant conditions also may include events known to produce a sudden influx of passengers, such as the scheduled time for Broadway shows to end or historic regularities in passenger spikes at the airport following flight arrivals. Still other taxi-relevant conditions may be weather-related conditions, i.e., precipitation, temperature, wind speed, etc. Taxi-relevant conditions are generally any identifiable conditions that may have an effect on taxi demand. This information is also preferably stored in a database, preferably a database linked with the trip-level taxi data (11). Although one embodiment of the invention factors in taxi-relevant conditions, this information is not required in all embodiments. For example, it may be possible to provide requested future taxi utilization information based solely on historic and/or recent taxi utilization information, i.e., without knowing any taxi-relevant conditions, and the invention is not limited to requiring this information.

Referring still to FIG. 1, in step 13, a processor performing the steps of the method receives a request for desired current or future contingent taxi utilization information of one or more types. For example, the desired information may be a) the number of taxi rides expected in the near future in a specific taxi's vicinity and/or b) taxi utilization information in that taxi's vicinity. In this example, the request for information likely will be accompanied by a location of the specific taxi at a specific time. Along with the request, the processor also may receive any number of other pieces of information, including taxi-relevant conditions such as current weather conditions. By way of non-limiting examples, the information provided to the processor may come from the user (such as a driver or dispatcher) requesting the information or it may come from a third-party source. For example, a weather service could provide weather conditions to the processor. In another embodiment, the request could be for predicted taxi demand for each street block at each time of each day over a month. In still other embodiments, the request may be for the number of passengers that would demand a taxi, the probability of finding a fare at a certain time/location, and/or the number of taxis that are in a certain area. In general, in this step the processor receives a request for any type of taxi utilization information that the user is looking to have generated by this algorithm.

Referring still to FIG. 1, in step 14, this embodiment of the invention determines, based on the request, one or more taxi demand aggregation categories. These are based on the requested information and, for example, be aggregated based on other factors influencing or likely to influence the requested information. The categories are determined based on types of historical contingent taxi utilization information expected to closely resemble the future contingent taxi utilization information, as well as on types of information that contain other relevant historic or recant contingent taxi utilization information that are relevant to estimating future taxi demand information, but not directly evident from the request. For example, aggregation categories might include a specific hour of the given day of the week for the given month at a certain street block, which would be indicated directly by a request for current demand at that street block. But, categories may also be defined for other instances of that hour for the same day of the week for other occurrences throughout the month or across other months.

The aggregation categories may be divided spatially or temporally. FIG. 2. shows a grid displaying how spatial taxi utilization information aggregation categories (32) could be overlaid on the historical taxi utilization data (30) indexed by location described by latitude and longitude or by position relative to roads (31). For illustration, this grid is overlaid over a set of points (30) which represent locations where the historic data contains a specific piece of data (e.g. the location where the data reports a taxi picked up a passenger). In this aggregation categorization, a single category is given as a geographic region, represented by a box in the grid. That is, any fares originating from a box are treated the same. In the step described below of getting information about each aggregation category, information about the exact box in the grid will be interesting, but so too may information about the surrounding boxes in the grid.

Similarly, FIG. 3 illustrates a definition of Temporal Taxi Utilization Information Aggregation Categories (401) which, in this case, combine the historical taxi utilization data that occurs within a similar month (month 102, not month 101, or month 103), day of week (301) and hour (401). In this case, the aggregation category combines historical taxi utilization data from the same hour of the same day of several weeks (201, 202, 203 and 204). Similarly, similar weather and taxi-relevant events can be aggregated to form other dimensions of Taxi Utilization Information Aggregation. For example, a category could be constructed for the hours following a major sporting event at a given particular location.

Other aggregation categories also may include recent data such as current demand for taxis. For instance, if a user requests the probability of a fare in a certain location, aggregation categories relating to the location (the exact location and the surrounding locales, for example), the events at the location, and the current weather may be created, but such categories would merely provide an idea about probable demand at the location. So, a distinct aggregation category for current taxi supply at and around that location would also be useful.

Referring again to FIG. 1, in step 15, the invention next retrieves historical and/or recent data corresponding to the aggregation categories. Given the historical taxi utilization information source or sources from (11) and aggregation levels from (14), the data is filtered to include only data relevant to estimating current and future taxi utilization information. This will help with the computational complexity and demands from analyzing a large data set, could be accomplished by retaining for analysis only the data form the identified aggregation categories from (14). As a result of the filtering step, summary information is generated about each of the aggregation categories. The information may be normalized so as to compare disparate types of information.

In step 16, the method according to an embodiment of the invention then generates representative taxi utilization information for the indicated taxi aggregation category based on the summary information. A model that produces current or future taxi utilization information can be constructed using this procedure. Given N observations about I types of recent or historical taxi utilization information (i.e. "input" demand information) for each of J aggregation levels (such as units of location, time, types weather, combinations of these etc.), K types of current or future taxi utilization information at each aggregation level are given by this equation:

$$F_{jk} = \sum_{i \in I} W_{ij} * \frac{(\overline{H_{ij}} - \overline{H_i})}{\sigma_{ij}^2} * P_{ik} \qquad (1)$$

Here F is the current or future utilization information (i.e. "output" demand information, indexed by k) that is estimated at each aggregation level (indexed by j). W is the weight placed on each type of historical or recent taxi utilization information (as further detailed below).

$$\frac{(\overline{H_{ij}} - \overline{H_i})}{\sigma_{ij}^2}$$

is the average historical or recent taxi utilization information for an aggregation level of a given type (indexed by i), and is standardized so that multiple measures of historical or recent taxi utilization information are comparable. $P_{ik}$ is an indicator variable reflecting beliefs about whether input utilization information is positively, negatively, related, or unrelated with each type of output utilization information.

The weights $W_{ij}$ are calculated based on the accuracy of each information type for each aggregation level across historical taxi utilization information. These accuracy scores may be calculated as the inverse of a measure of variability across the n observations within the aggregation level. In the following equation, the aggregation-level-specific, output utilization information-specific variance ($\sigma_{ij}^2$) is considered relative to the overall output utilization information variance ($\sigma_i^2$) in order for the different types of historic taxi utilization information to be comparable. This is inversed to convert from a variability measure to a precision measure, and the weight placed on each historic taxi utilization information type (for each aggregation category) is equal to the share of the precision measure for that category-specific information type relative to the sum of all category-specific precision measures. Mathematically, the weights can be calculated as:

$$W_{ij} = \frac{(\sigma_{ij}^2 / \sigma_i^2)^{-1}}{\sum_{i \in I} ((\sigma_{ij}^2 / \sigma_i^2)^{-1})} \quad (2)$$

In other words, the weight placed on the aggregation-level mean of each type of input utilization information in calculating each aggregation-level output utilization information type, is given as the accuracy of observed values of the type of input utilization information across the aggregation-level in question, relative to the expected accuracy across all aggregation categories.

For example, in the example above where a user requests the probability of a fare in a certain location, aggregation categories relating to the location, the events at the location, the current weather, and the current supply of taxis at and around that location may be created. Information about each of those categories is retrieved from the databases containing the historical and recent taxi utilization information and that information is subjected to the algorithm provided above. For example, the Routine could produce representative unmet demand information for each street block for each hour of each weekday based on considering both the number of taxi dropoffs and the number of taxi pickups. In this instance, more dropoffs corresponds with greater supply and more pickups corresponds with greater demand, so both pieces of information would be valuable in estimating unmet demand. For some aggregation categories, demand has historically been more stable than supply and in others, less stable. The weights placed on the two factors adjust for the variability of the factors, and hence, the constructed representative information places a greater weight on information expected to be more accurate.

One important modification to the above weighting occurs when there is only one observation per aggregation level. In that case, $P_{ik}$ remains the same, $$\frac{(\overline{H_{ij}} - \overline{H_i})}{\sigma_{ij}^2}$$

is adjusted to become $$\frac{(H_{ij} - H_i)}{\sigma_i^2},$$

which standardizes the single observed value based on the mean and standard deviation historical taxi demand information across aggregation categories. Similarly, the weighting function could collapse to evenly consider each of the historic taxi demand information types.

Referring again to FIG. 1, the output of the described algorithm returns the generated representative taxi utilization information (17) for use in applications. This could be transmitted via Internet transfer protocol or be stored in a database that is accessible by SQL-enabled coding scripts. To a taxi-driver or a dispatcher, the information may be represented on a display screen or the like as one or more locations where demand is likely. Upon providing this information, the method ends at step 18.

Without the present invention, historic and recent taxi demand information is in a form that is uninformative about future taxi utilization. However, the invention uses this historic and recent taxi utilization information along with other factors and variables to determine representative taxi utilization information for the future. The advantages of the present invention include, without limitation, that taxi drivers can utilize this invention to possess information about their taxi demand rates were they to make various choices about where to go. This is relevant because it can inform their choice of what route to take to maximize their chance of finding a fare or whether the chances of finding a fare are sufficiently low that their time is better spent at home or taking a break. This added information will ease congestion in the city, reduce taxi driver aggressiveness and fatigue, which will increase road safety. It will reduce noise and atmospheric pollution by enabling drivers to plan better routes, and will provide passengers with better access to taxis.

As will be appreciated from the foregoing description, the invention is highly customizable to provide a user with any requested current or future utilization information. Different drivers and/or dispatchers may wish to use different criteria for determining future utilization. For example, some drivers may wish to factor into their decisions the likelihood that they'll be able to get a fare upon dropping off the preceding fare. Historical information may include information about where taxi rides originating from a certain location generally terminate, and an aggregation category can be determined based on these factors. Other similar modifications may be made.

While preferred embodiments have been described herein in connection with predicting future taxi utilization information for street taxis, the invention is not so limited. As will be appreciated by those having ordinary skill in the art, having read and understood this specification, embodiments of the invention will be readily applicable to any passenger motor vehicle service.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A method of predicting taxi utilization information, comprising:
   storing in a database at least one of historical taxi utilization information and recent taxi utilization information;
   receiving a request for current or future taxi utilization information;
   identifying taxi aggregation categories based on the requested current or future taxi information;
   applying the taxi aggregation categories using a computer processor, to at least one of the historical taxi utilization information and the recent taxi utilization information to generate summary information about data relevant to the aggregation categories; and
   predicting the requested current or future taxi information based on generated summary information;
   wherein the step of predicting comprises solving:

$$F_{jk} = \sum_{i \in I} W_{ij} * \frac{(\overline{H_{ij}} - \overline{H_i})}{\sigma_{ij}^2} * P_{ik}$$

wherein: I represents types of recent or historical taxi utilization information for each of J aggregation categories and K types of current or future taxi utilization information for each aggregation category, W is a weighting function, $$\frac{(\overline{H_{ij}} - \overline{H_i})}{\sigma_{ij}^2}$$

is the average historical or recent taxi utilization information for an aggregation category of a given type (indexed by i), and $P_{ik}$ is an indicator variable reflecting beliefs about whether input demand information is positively, negatively, related, or unrelated with each type of output utilization information.

2. The method of claim 1, wherein the current or future taxi utilization information includes at least one of current or future taxi demand information and supply information.

3. The method of claim 1, further comprising providing taxi relevant conditions.

4. The method of claim 3, wherein the identifying step comprises identifying taxi aggregation categories relative to the taxi relevant conditions.

5. The method of claim 4, wherein the generated summary information includes information about the taxi aggregation categories relative to the taxi relevant conditions.

6. The method of claim 3, wherein the taxi relevant conditions comprise one or more of weather and event data.

7. The method of claim 1, wherein the step of predicting current or future taxi utilization information factors at least one of a) the expected number of pickups at a location and time, b) expected number of pickups at various locations regardless of time, c) expected number of pickups at various times regardless of location, and d) expected unmet demand based on predicted supply and predicted demand.

8. The method of claim 1, wherein the weighting function W comprises a weight placed on each type of historical or recent taxi utilization information based on a calculated relative historical accuracy value for each type of taxi utilization information for each aggregation category relative to all types of taxi utilization information included in the summary information.

9. The method of claim 1, wherein the average historical or recent taxi utilization information for an aggregation category is standardized so that multiple measures of historical or recent taxi utilization information are comparable.

10. A taxi utilization apparatus comprising:
    a memory storing at least one of historical taxi utilization information and recent taxi utilization information;
    a computer processor configured to receive a request for current or future taxi utilization information, generate aggregation categories based on the request, and apply the taxi aggregation categories to at least one of the historical taxi utilization information and the recent taxi utilization information to generate summary information about data relevant to the aggregation categories, and to predict the requested current or future taxi utilization information, wherein the prediction is made by solving:

$$F_{jk} = \sum_{i \in I} W_{ij} * \frac{(\overline{H_{ij}} - \overline{H_i})}{\sigma_{ij}^2} * P_{ik}$$

wherein: I represents types of recent or historical taxi utilization information for each of J aggregation categories and K types of current or future taxi utilization information for each aggregation category, W is a weighting function, $$\frac{(\overline{H_{ij}} - \overline{H_i})}{\sigma_{ij}^2}$$

is the average historical or recent taxi utilization information for an aggregation category of a given type (indexed by i), and $P_{ik}$ is an indicator variable reflecting beliefs about whether input taxi utilization information is positively, negatively, related, or unrelated with each type of output utilization information; and
   a transmitter for conveying to a user the requested taxi utilization information.

11. The taxi utilization apparatus of claim 10, wherein the transmitter transmits the taxi demand information to a graphical display.

12. The taxi utilization apparatus of claim 11, wherein the graphical display is disposed in a taxi for viewing by a taxi driver.

13. The taxi utilization apparatus of claim 12, wherein the graphical display is a map illustrating locations for probable fares.

14. The taxi utilization apparatus of claim 11, wherein the graphical display is provided to a dispatcher to dispatch taxis to locations for probable fares.

15. The taxi utilization apparatus of claim 10, wherein the memory further stores taxi relevant conditions.

16. The taxi utilization apparatus of claim 15, wherein the taxi relevant conditions comprise at least one of weather and event data.

17. The taxi utilization apparatus of claim 10, wherein the weighting function W comprises a weight placed on each type of historical or recent taxi demand information based on a calculated relative historical accuracy value for each type of taxi utilization information for each aggregation category relative to all types of taxi utilization information included in the summary information.

18. The taxi utilization apparatus of claim 10, wherein the average historical or recent taxi utilization information for an aggregation category is standardized so that multiple measures of historical or recent taxi utilization information are comparable.

19. A method of predicting taxi utilization information, comprising:
   storing in a database at least one of historical taxi utilization information and recent taxi utilization information;
   receiving a request for current or future taxi utilization information from a requestor regarding probability of finding a fare in a certain location;
   providing taxi relevant conditions, wherein the taxi relevant conditions include at least a schedule of taxi-relevant events;
   selecting taxi aggregation categories based on (i) groupings of locations in a transportation grid and (ii) periods in time, and the taxi relevant conditions;
   applying the selected taxi aggregation categories using a computer processor, to at least one of the historical taxi utilization information and the recent taxi utilization information to generate summary information about data relevant to the aggregation categories; and
   predicting a current or future taxi information along a given route based on the generated summary information and informing the requestor's choice of what route to take to maximize chance of finding a fare, wherein the predicting is a function of the types of historical or recent taxi utilization information included in the summary information for each of the aggregation categories, and wherein each type of historical or recent taxi utilization information included in the summary information is weighted based on the accuracy of each information type for each aggregation level across historical taxi utilization information.

20. The method of claim 19, wherein the transportation grid includes location described by latitude and longitude or by positions relative to roads.

21. The method of claim 19, wherein the periods in time include at least one of similar hours of the day, days of the week, and months of the year.

22. The method of claim 19, wherein the summary information includes an indication of correspondence of at least one of a taxi supply and a taxi demand at at least one of a taxi pickup and a taxi dropoff in the transportation grid.

23. A method of predicting taxi utilization information, comprising:
   storing in a database at least one of historical taxi utilization information and recent taxi utilization information;
   receiving a request for current or future taxi utilization information from a requestor including probability of finding a fare in a certain location;
   providing taxi relevant conditions, wherein the taxi relevant conditions include at least a schedule of taxi-relevant events;
   identifying taxi aggregation categories based on the requested current or future taxi information and the taxi relevant conditions;
   applying the taxi aggregation categories using a computer processor, to at least one of the historical taxi utilization information and the recent taxi utilization information to generate summary information about data relevant to the aggregation categories; and
   predicting the requested current or future taxi information based on the generated summary information and informing the requestor's choice of what route to take to maximize chance of finding a fare, wherein the predicting is a function of the types of historical or recent taxi utilization information included in the summary information for each of the identified aggregation categories, and wherein each type of historical or recent taxi utilization information included in the summary information is weighted based on the accuracy of each information type for each aggregation level across historical taxi utilization information.

24. The method of claim 23, wherein each type of historical or recent taxi utilization information included in the summary information is weighted based on a calculated relative historical accuracy value for each type of taxi utilization information for each aggregation category relative to all types of taxi utilization information included in the summary information.

25. The method of claim 23, wherein the current or future taxi utilization information includes at least one of current or future taxi demand information and supply information.

26. The method of claim 23, wherein the taxi relevant conditions comprise one or more of weather and event data.

27. The method of claim 23, wherein the step of predicting current or future taxi utilization information factors at least one of a) the expected number of pickups at a location and time, b) expected number of pickups at various locations regardless of time, c) expected number of pickups at various times regardless of location, and d) expected unmet demand based on predicted supply and predicted demand.

28. A taxi utilization apparatus comprising:
   a memory storing at least one of historical taxi utilization information and recent taxi utilization information;
   a computer processor configured to receive a request for current or future taxi utilization information from a requestor including probability of finding a fare in a certain location, receive taxi relevant conditions wherein the taxi relevant conditions include at least a schedule of taxi-relevant events, generate aggregation categories based on the request and the taxi relevant conditions, and apply the taxi aggregation categories to at least one of the historical taxi utilization information and the recent taxi utilization information to generate summary information about data relevant to the aggregation categories, and to predict the requested current or future taxi utilization information and inform the requestor's choice of what route to take to maximize chance of finding a fare, wherein the prediction is based on generated summary information, wherein the predicting is a function of the types of historical or recent taxi utilization information included in the summary information for each of the identified aggregation categories, and wherein each type of historical or recent taxi utilization information included in the summary information is weighted based on a calculated relative historical accuracy value for each type of taxi utilization information for each aggregation category relative to all types of taxi utilization information included in the summary information; and
   a transmitter for conveying to a user the requested taxi utilization information.

* * * * *